United States Patent
Liu

(10) Patent No.: US 7,256,930 B2
(45) Date of Patent: Aug. 14, 2007

(54) HIGH POWER PULSE SHAPING FIBER LASER FOR HIGH DATA RATE FREE SPACE TELECOMMUNICATION SYSTEMS

(76) Inventor: Jian Liu, 1773 Karameos Ct., Sunnyvale, CA (US) 94087

( * ) Notice: Subject to any disclaimer, the term of this patent is extended or adjusted under 35 U.S.C. 154(b) by 342 days.

(21) Appl. No.: 10/825,746

(22) Filed: Apr. 15, 2004

(65) Prior Publication Data
US 2005/0036525 A1    Feb. 17, 2005

Related U.S. Application Data

(60) Provisional application No. 60/474,630, filed on Jun. 2, 2003, provisional application No. 60/462,880, filed on Apr. 15, 2003.

(51) Int. Cl.
*H04B 10/12* (2006.01)
(52) U.S. Cl. .................................. 359/337.1
(58) Field of Classification Search ............... 359/264, 359/337.21, 349
See application file for complete search history.

(56) References Cited

U.S. PATENT DOCUMENTS

| | | | | |
|---|---|---|---|---|
| 5,608,571 | A * | 3/1997 | Epworth et al. | 359/337.21 |
| 5,673,129 | A * | 9/1997 | Mizrahi | 398/95 |
| 5,680,489 | A * | 10/1997 | Kersey | 385/12 |
| 6,208,672 | B1 * | 3/2001 | Gunning et al. | 372/12 |
| 6,212,306 | B1 * | 4/2001 | Cooper et al. | 385/12 |
| 6,330,089 | B1 * | 12/2001 | Yamada | 398/9 |
| 6,335,819 | B1 * | 1/2002 | Cho et al. | 359/333 |
| 6,377,392 | B1 * | 4/2002 | Mizrahi | 359/337.21 |
| 6,580,532 | B1 * | 6/2003 | Yao et al. | 398/39 |
| 7,003,180 | B2 * | 2/2006 | Richardson et al. | 385/1 |
| 2004/0136716 | A1 * | 7/2004 | Jung et al. | 395/85 |
| 2004/0213574 | A1 * | 10/2004 | Han et al. | 398/71 |
| 2004/0240037 | A1 * | 12/2004 | Harter | 359/333 |
| 2004/0263949 | A1 * | 12/2004 | Gu et al. | 359/333 |
| 2005/0012985 | A1 * | 1/2005 | Tsadka et al. | 359/333 |

* cited by examiner

*Primary Examiner*—Deandre M. Hughes
(74) *Attorney, Agent, or Firm*—Bo-In Lin

(57) ABSTRACT

An amplified laser source for amplifying a laser projection that includes a diode laser source modulated by a pulse generator applying an alternate high and low voltages higher and lower than a threshold voltage for projecting a modulated optical signal. The laser source further includes a first erbium-doped fiber (EDF) for amplifying the modulated optical signal. The laser source further includes a set of Bragg gratings for receiving the modulated optical signal from the first EDF for reflecting a grating-specific pulse-distortion-reduced optical signal. The laser source further includes an electro-absorption (EA) modulator synchronized with the pulse generator for increasing an extinction ratio of the optical signals. The laser source further includes a second erbium doped fiber (EDF) for receiving and amplifying the optical signal from the EA modulator wherein the second erbium doped fiber (EDF) having a length of several meters and a diameter greater than or equal to thirty-five micrometers.

14 Claims, 19 Drawing Sheets

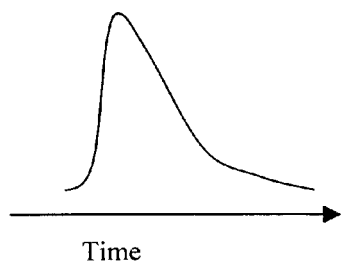
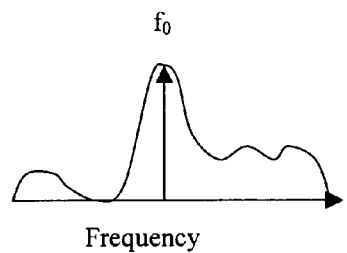
Fig. 1A (Prior Art)
Fig. 1B (Prior Art)
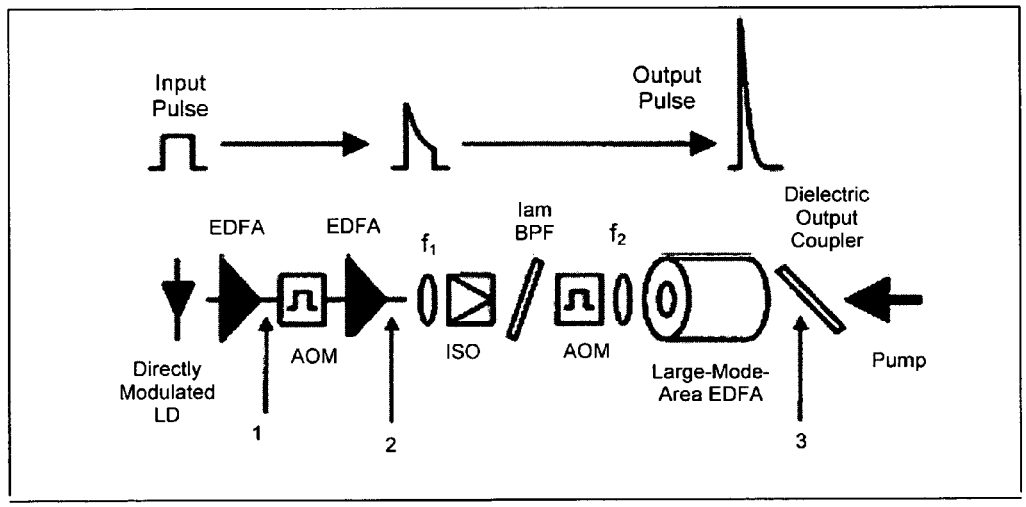
Fig. 1C (Prior Art)

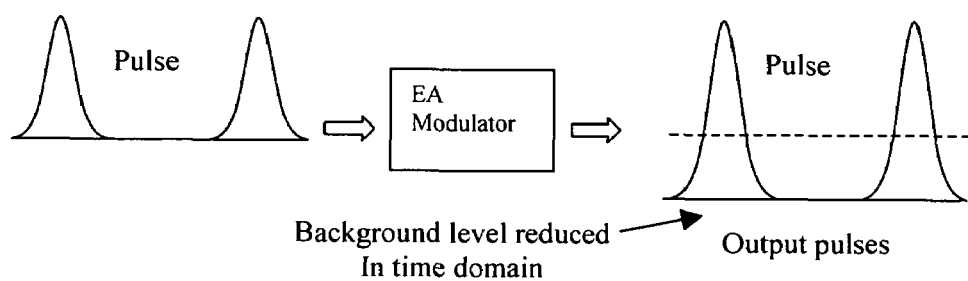
Fig. 5A                                           Fig. 5B

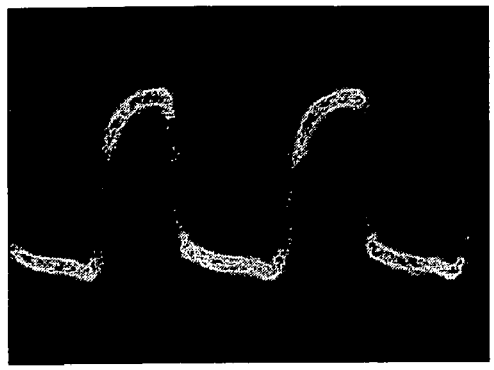
Fig. 11A-Point A
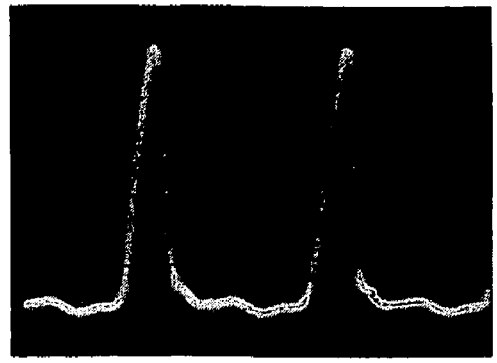
Fig. 11B-Point B
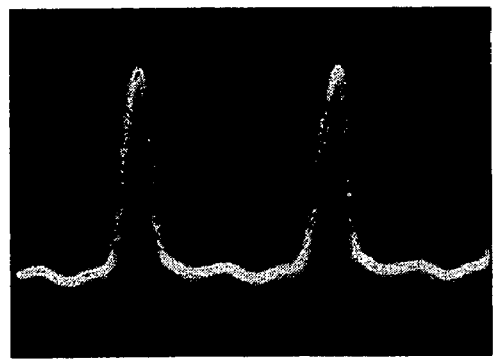
Fig. 11C-Points C&D
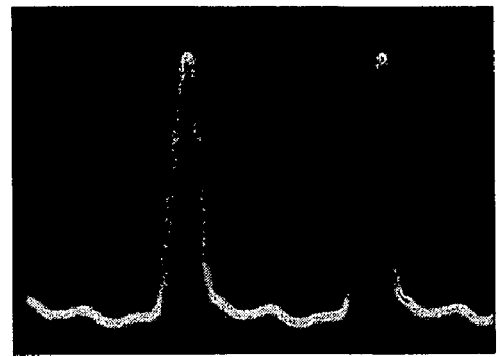
Fig. 11D Point E
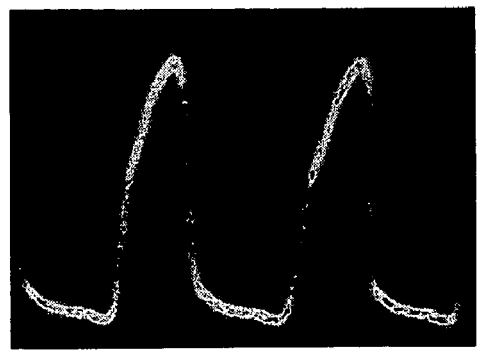
Fig. 11E  Pulse distortion occurs w/o a filter

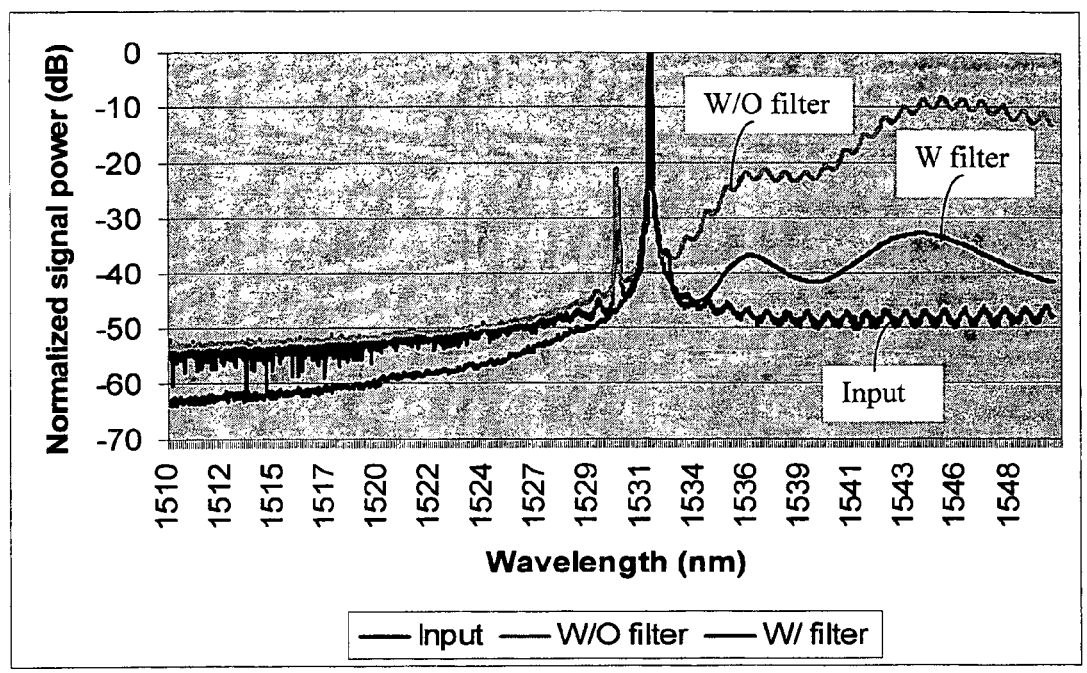
Fig. 12 Input and output optical spectra of the fiber laser

HIGH POWER PULSE SHAPING FIBER LASER FOR HIGH DATA RATE FREE SPACE TELECOMMUNICATION SYSTEMS

This Formal Application claims a Priority Date of Apr. 15, 2003 and Jun. 2, 2003 benefited from two Provisional Applications 60/462,880 and 60/474,630 filed by the same Applicant of this Application filed on Apr. 15, 2003 and Jun. 2, 2003 respectively.

FIELD OF THE INVENTION

The present invention relates generally to apparatuses and methods for providing high power laser sources. More particularly, this invention relates to new configurations and methods for providing compact and high power pulse shaping fiber laser suitable for implementation in high data rate free space telecommunication systems.

BACKGROUND OF THE INVENTION

Conventional technologies for providing high power fiber laser sources for future free space telecommunication systems are still limited by several technical difficulties. Specifically, in the processes of producing high-energy pulses, current techniques and systems tend to sharpen the temporal responses and create a high peak region in the leading edge of the pulse. The high power leading edge causes potential optical damages of the internal components of the laser source and further reduces the transmission distance due to a non-transform limited pulse shape. The sharp leading edge of the laser pulses when projected into the optical components in an optical transmission system generates a high-energy shock over very short time duration. This instantaneous energy shock may well be over the damage threshold of the components, e.g., the damage thresholds of the photo-detectors and optical filters, and thus cause instantaneous system malfunction and that often leads to permanent damage. Moreover, for an optical communication system, the higher power density caused by these sharpened temporal responses and higher leading edge of the laser pulse are often detrimental to the detection subsystem due to the energy transfer to the Stokes lines now provided with a stronger fiber amplifier.

Another technical difficulty that often limits the capabilities of a fiber laser source is related to the laser chirp due to modulation and self phase modulation (SPM) that leads to distortions of the laser pulses. As that shown in FIGS. 1A and 1B, the time dependent frequency of a laser pulse in the frequency domain depends on the deviation of the pulse power. The relationships can be expressed by the following equations according to F. Koyama as disclosed in "Frequency Chirping in External Modulators" published in the Journal of Lightwave Technology, Volume 6, No. 1, 1988.

$$f_{ist}(t) = f_0 + \frac{\alpha}{4\pi} \frac{\partial S(t)/\partial t}{S(t)}$$

$$\alpha = 2S \frac{\partial \Phi/\partial t}{\partial S/\partial t}$$

The equations show that as the steepness of the pulse in time domain increases the frequency shift also increases. Under practical operational conditions, the optical signals are generally transmitted over a dispersive medium. As a result, when the signals are transmitted over a distance over a dispersive medium, more distortions are increasingly introduced into the optical signals and as the signals are spread over a broadened frequency range that usually also generates optical signals with an unsymmetrical spectrum. Therefore, the pulse distortions as encountered in the practical operational conditions described above, further causes the steepness of the laser pulses thus worsening the problems resulted from the high power at the lead-edging of the laser pulses.

Many laser source technologies are known and available for those of ordinary skill in the art. For application to modern telecommunication systems, due to the requirements to have well-defined pulse shape and large extinction ratios, the traditional Q-fiber lasers as disclosed by several prior art publications are no longer useful. These publications include: J. Yang, et al., "Wide band erbium doped fiber ring laser using switchable fiber Bragg gratings," SPIE 4594, 282 (2001); G. P. Lee, et al., "980 nm diode pumped Er/Yb doped Q switch fiber laser." Electron. Lett. 31(21), 1836-1837(1995); G. P. Lee, et al., "Q switched erbium doped fiber laser utilizing a novel large mode area fiber." Electron. Lett. 33(5), 393-394(1998); R. J. Mears, et al., "Low threshold tunable CW and Q-switch fiber laser operating at 1.55 micon," Electron. Lett. 22(3), 159-160(1986); P. Mylinski, et al., "High power Q switched erbium doped fiber laser," IEEE J. Quantum Electron. 28, 371-377 (1992); F. Sequin, et al, "Diode pumped Q switch laser," Opt. Eng. 32(9), 2036-2041 (1993); M. Sejka, et al., "High repetition rate Q switch erbium doped fiber ring laser," Optical Fiber Technology 1, 167-170 (1995); and A. Chandonnet, et al., "High power Q switched erbium fiber laser using an all fiber intensity modulator," opt. Eng. 32(9), 2031-2035 (1993).

More technologies to improve the performance and power of the laser sources were also investigated and published. However, the above-mentioned technical difficulties are not yet resolved by prior art investigations as disclosed in the many publications in the field of fiber laser researches. These disclosures include different amplification schemes used as alternative techniques to produce high energy and high repetition rate pulses via a gated amplification. The results are published by B. Desthieux, R. L. Laming, and D. N. Payne, entitled "111 kW Pulse amplification at 1.5 micron," Appl. Phys. Lett. 63(5), 585-588 (1993); D. Taverner, et al., "Generation of high energy pulses using a large mode area erbium doped fiber amplifier," Proc. CLEO'96, 496-497 (1996); and D. Gapontsev, et al., "25 kW peak power, wide tunable repetition rate and pulse duration eye safe MOPFA laser," Proc. CLEO'96, 209-210 (1996). Techniques by using multiple isolated gain stages were also investigated and published by A. Galvanauskas, et al., "Compact ultra high power laser system," SPIE 2377, 117-126 (1995); D. Taverner, et al., "158 micron Joul pulses from a single transverse mode, large mode area erbium doped fiber amplifier," Opt. Lett. 22 (6), 378-380 (1997); and D. Rafizadeh, et al., "Kilowatt pulses from a single mode erbium doped amplifier," Electron. Lett. 317-318 (1994). However, these techniques have not been successful to provide solution for the technical difficulties caused by sharpened temporal responses in the leading edge of high power laser pulses and different pulse distortions caused by laser chirp difficulties. FIGS. 1C and 1D is an example extracted from Opt. Lett. 22, 378 (1997) to illustrate the pulse shape evolution in amplifiers over test points 1,2, and 3. The sharp leading edges as discussed above are clearly shown in these figures. As shown by FIGS. 1C and 1D, the prior art technologies as those available to those of ordinary skill in the art, have not provided system configurations and methods to overcome these difficulties.

Therefore, a need still exists in the art of fiber laser source design and manufacture to provide a new and improved configuration and method to provide high power laser source with compact configuration, low power consumptions and high quality pulse shapes with high extinction ratio and overall power utilization efficiency.

SUMMARY OF THE PRESENT INVENTION

It is therefore an object of the present invention to provide a laser source that includes components to carry out pulse shape corrections such that the difficulties and limitations of the conventional ASE sources can be resolved.

Briefly, in a preferred embodiment, the present invention discloses an amplified laser source for amplifying a laser projection that includes a diode laser source modulated by a pulse generator applying an alternate high and low voltages higher and lower than a threshold voltage for projecting a modulated optical signal. The laser source further includes a first erbium-doped fiber (EDF) for amplifying the modulated optical signal. The laser source further includes a set of Bragg gratings for receiving the modulated optical signal from the first EDF for reflecting a grating-specific pulse-distortion-reduced optical signal. The laser source further includes an EA modulator synchronized with the pulse generator for increasing an extinction ratio of the optical signals. The laser source further includes a second erbium doped fiber (EDF) for receiving and amplifying the optical signal from the Electro-Absorption (EA) modulator wherein the second erbium doped fiber (EDF) having a length of several meters and a diameter greater than or equal to thirty-five micrometers.

In essence this invention discloses an amplified laser source for amplifying a laser projection that includes a set of Bragg gratings for reflecting a grating-specific pulse-distortion-reduced optical signal.

In a preferred embodiment, this invention further discloses a method for configuring an amplified laser source for amplifying a laser projection. The method includes a step of employing a set of Bragg gratings for reflecting a grating-specific pulse-distortion-reduced optical signal. In a preferred embodiment, the method further includes a step of modulating a diode laser source by a pulse generator applying an alternate high and low voltages higher and lower than a threshold voltages for projecting a modulated optical signal to the Bragg gratings. In another preferred embodiment, the method further includes a step of amplifying an optical signal from the diode laser by a first erbium-doped fiber (EDF).

These and other objects and advantages of the present invention will no doubt become obvious to those of ordinary skill in the art after having read the following detailed description of the preferred embodiment, which is illustrated in the various drawing figures.

BRIEF DESCRIPTION OF THE DRAWINGS

FIGS. 1A and 1B, show the time dependent frequency of a laser pulse in the frequency domain depends on the deviation of the pulse power.

FIGS. 1C to 1D illustrate an example for showing the pulse shape evolution in a conventional amplifier.

FIGS. 5A and 5B shows the input pulses to the EA modulator and the output pulses generated from the EA modulator with the background level reduced for extinction ratio improvement.

FIGS. 11A to 11E are pulse shapes measured at different locations of as that illustrated in FIGS. 2, 8, 9 and 10.

FIG. 12 shows the spectra for input and output amplified signals for illustrating that the improvement of the pulse shaping a lower noise level of the output amplified signal at least 20 dB lower achieved by the power-pulse shaping laser source of this invention.

DETAILED DESCRIPTION OF THE INVENTION

Figure 2:
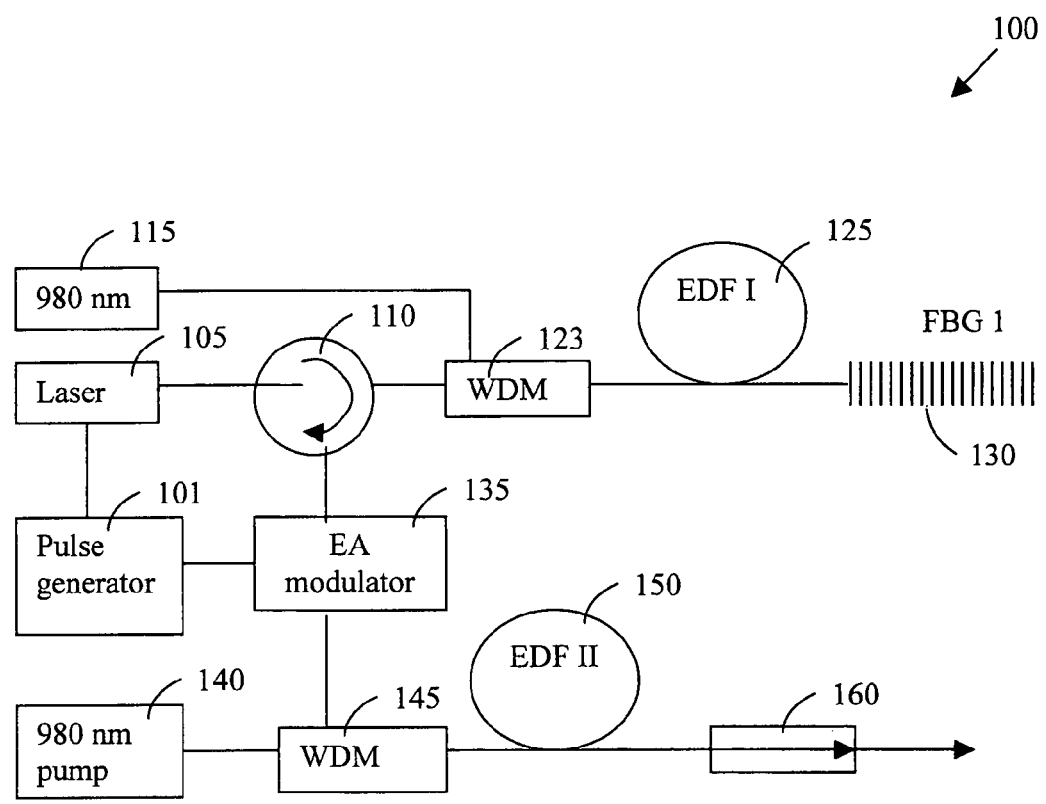
FIG. 2 is a schematic functional block diagram for showing a high power pulse-shaping fiber laser source of this invention.

FIG. 2 shows a schematic diagram of an improved laser source of the present invention to resolve the issues of pulse distortion and nonlinear effects such as stimulated Brillouin scattering (SBS), SPM, and stimulated Raman scattering (SRS) by employing a fiber grating with large mode area fiber amplifier, and modulating the source below threshold current to increase the extinction ratio. The high power fiber laser 100 includes a modulated laser diode 105 that sends out a sequence of pulses generated from a pulse generator 101 to pass through a circulator 110 to enter into a first amplification stage powered by a lower power pump laser diode 115 through a first wavelength division multiplexer (WDM)

123 and a high NA EDF-I 125 to amplify the input signal into a low noise amplified signal projected to a fiber Bragg gratings 130. The laser diode 105 is modulated in a way that the pulse generator 101 applies alternative high and low voltages at certain frequency. The laser diode 105 has light output only when the laser is driven above its threshold as that shown-in FIGS. 3A and 3B. Thus if the low voltage applied to it is below the threshold, it will have no light out and the extinction ratio, i.e., a ratio of the maximum output to the minimum output of the light, is kept at a very low level.

Figures 3A, 3B:
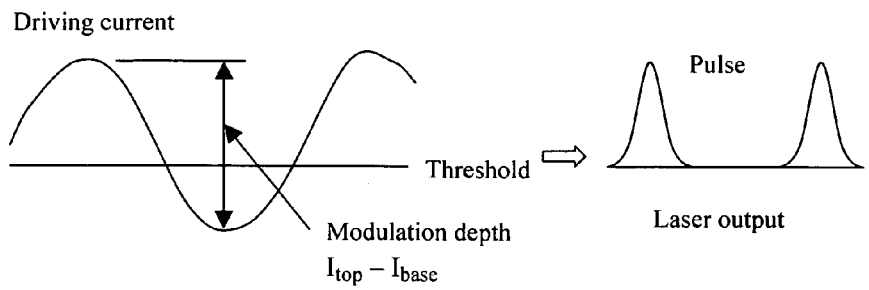
FIGS. 3A and 3B show the waveforms of input to a modulation driving current and the laser output pulses
Figure 3C:
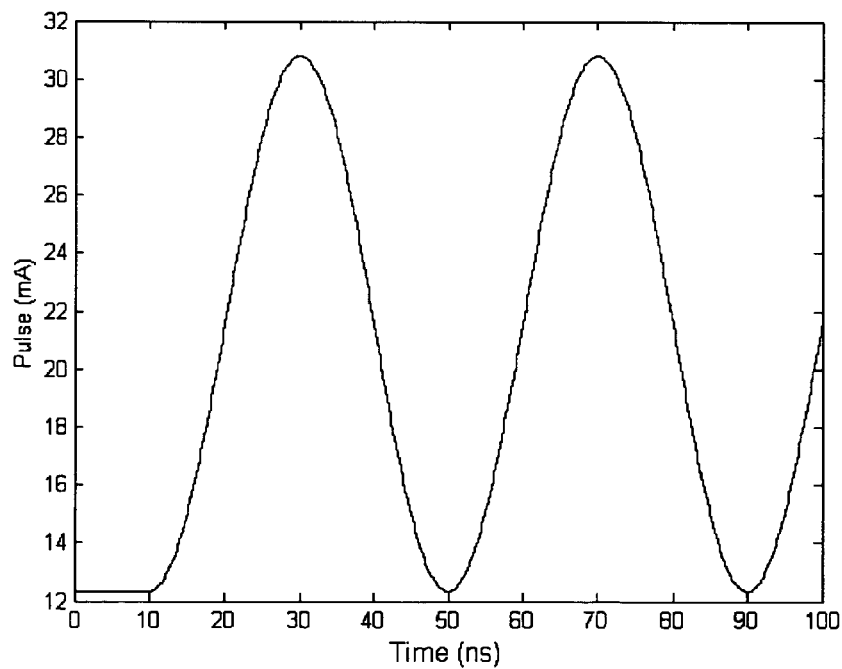
FIG. 3C shows the sinusoidal wave driving pulse inputted to the EA modulator.
Figure 3D:
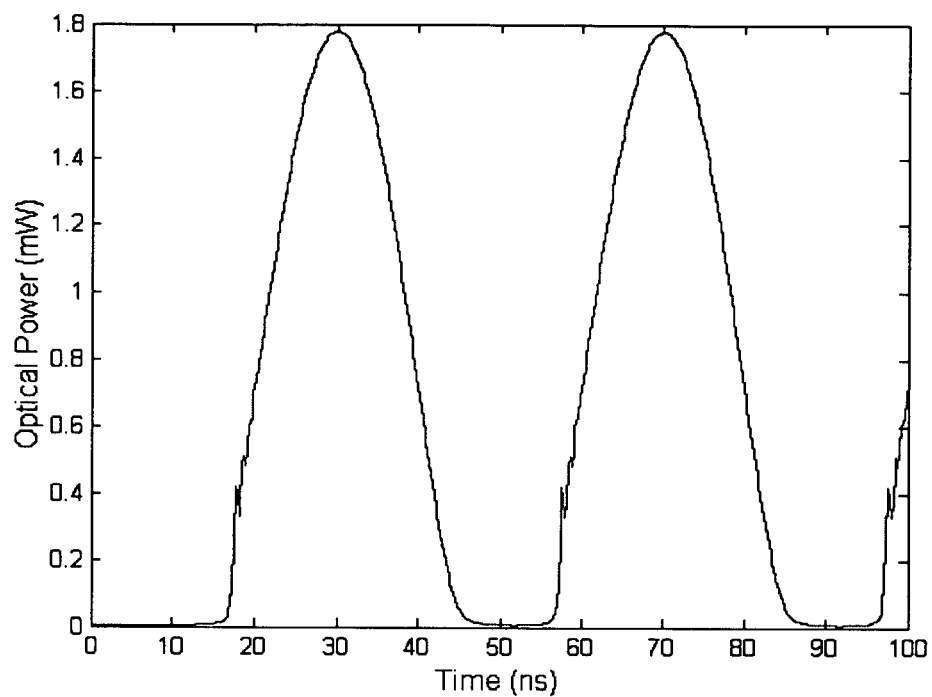
FIGS. 3D, 3E and 3F show the response of the optical power from the EA modulator and the carrier density and the frequency chirp respectively.
Figure 3E:
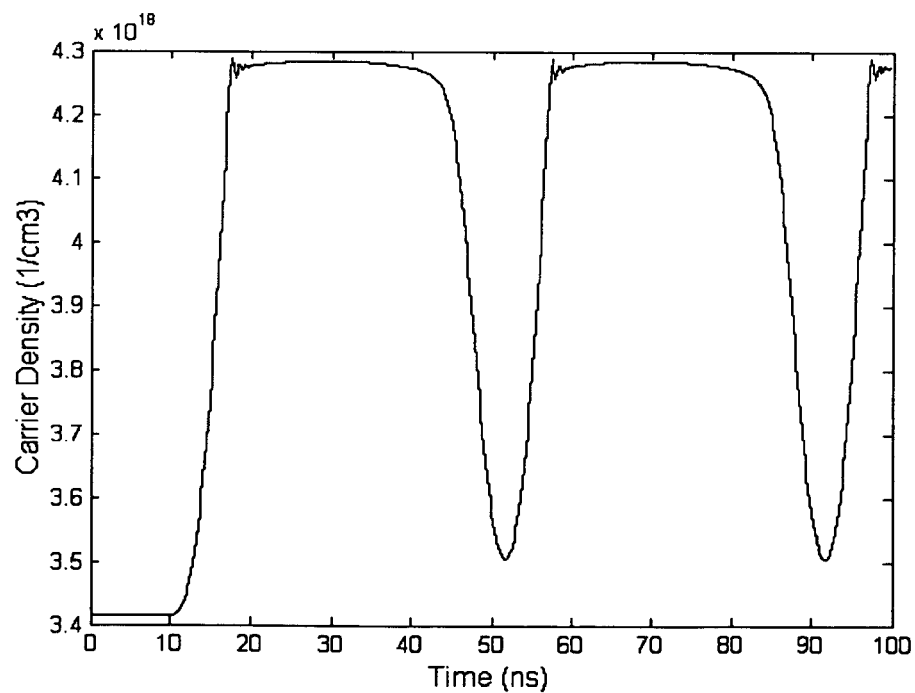
Figure 3F:
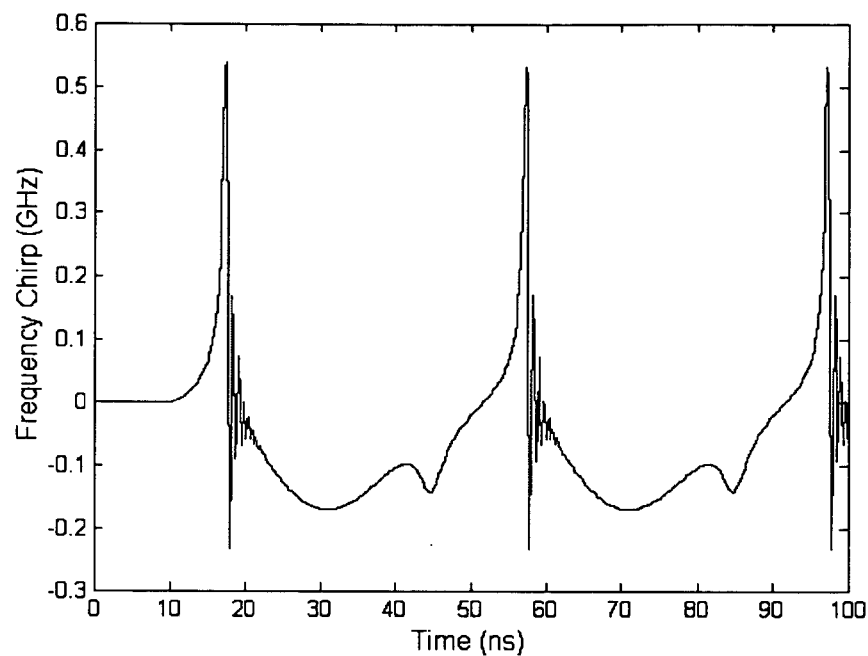

Referring to FIGS. 3C and 3D for the sinusoidal wave driving pulse and pulse response and detail analyses for the direct modulation lasers are disclosed in references such as "Semiconductor Laser", International Thomson Publishing, 1993 by G. P. Agrawal and N. K. Dutta; "High Frequency Current Modulation", Chapter 2 by K. Y. Lau and A. Yariv, Part B Semiconductor Injection Laser I, Volume 22 Lightwave Communication Technology, edited by W. T. Tsnag, Academic Press, 1985. "Mode controlled Semiconductor Lasers", Chapter 5 by I. P Kaminow and R. S. Tucker, in Guided-Wave Optoelectronics, edited by T. Tamir, 1988. It starts with the basic rate equations that govern the dynamics of carriers and photons in semiconductor lasers. The rate equations are then numerically solved for the steady state and large-signal solutions and applied for Lucent direct modulation DFB lasers. The Gaussian pulse generation by using a sine wave driving current is plotted in FIG. 3C. The modulation conditions are $I_{base}=0.8I_{th}$, $I_{top}=2.0I_{th}$ the definitions of these terms are illustrated in FIGS. 3A and 3B. The responses of optical power, carrier density and frequency chirp are plotted in FIGS. 3D, 3E and 3F respectively. The optical pulse shape is close to a Gaussian shape.

Figure 3G:
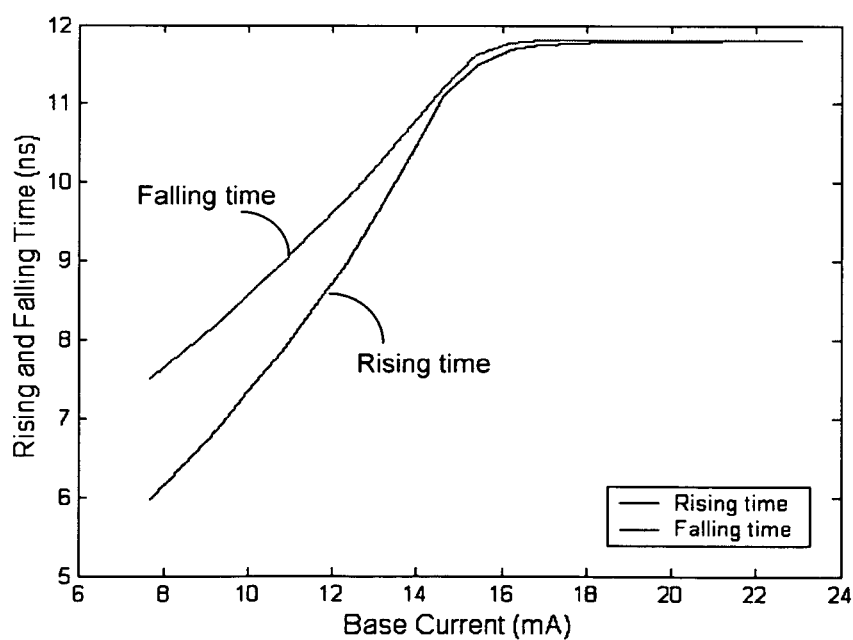
FIG. 3G shows the rise and fall times as function of base current of pulse.
Figure 3H:
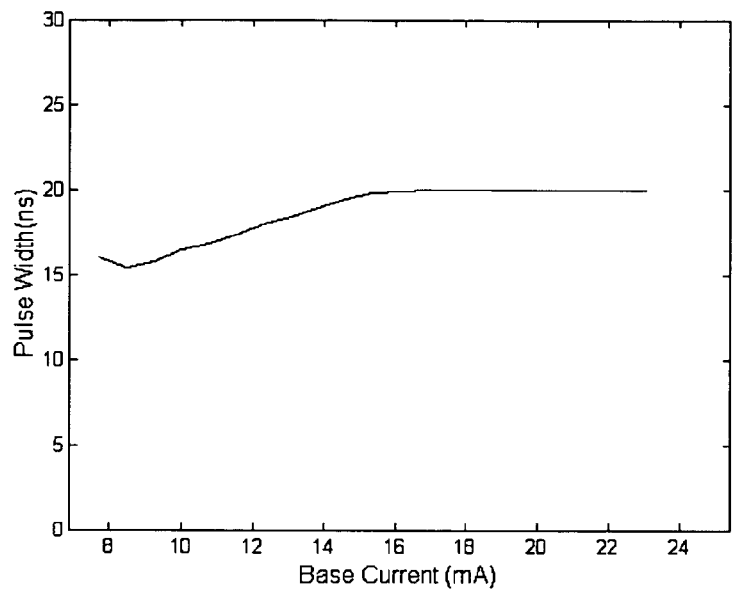
FIG. 3H shows the variation of the pulse width with the variation of the base current.
Figure 3I:
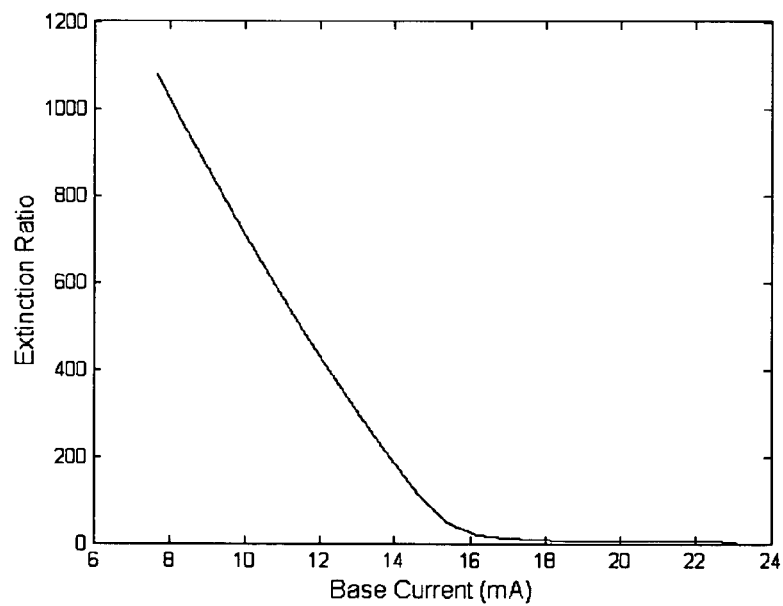
FIG. 3I shows an extinction ratio over 30 dB is achievable when the base current is about half of the threshold current as that shown in shown in FIG. 3J.
Figure 3J:
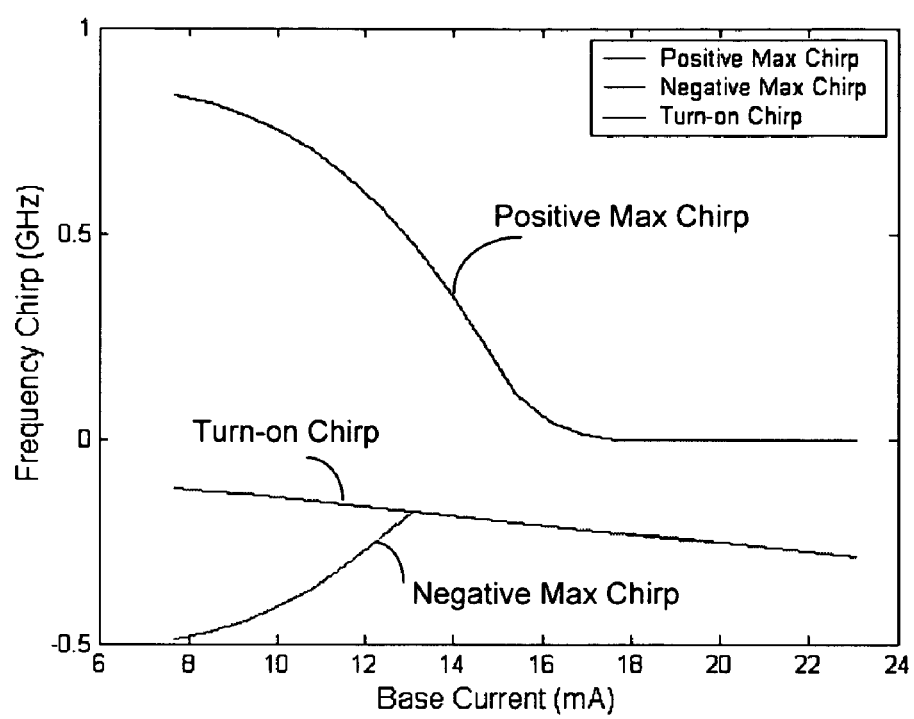

FIG. 3G shows the rise and fall times as function of base current of pulse. According to FIG. 3G, the rise and full times increase as the base current increases until the base current reaches the laser threshold. FIG. 3H shows the variation of the pulse width with the variation of the base current. As shown in FIG. 3H, the pulse width basically maintains the same value as the base current changes. FIG. 3I shows an extinction ratio over 30 dB is achieved when the base current is about half of the threshold current as that shown in shown in FIG. 3J.

Referring to FIG. 2 again, the Bragg gratings 130 reflect the pulses back and in the meanwhile filter the amplified spontaneous emission source (ASE) and also shape the pulses. The Bragg gratings 130 are implemented with fiber gratings with either photosensitive large mode area or regular photosensitive fiber fusion spliced together. A fiber Bragg grating used in the fiber laser for balance and correct the pulse shape distortion caused the SPM and XPM has to be chirped to give a large dispersion and frequency chirp to manipulate the 1 ns high peak power pulses. The relation between dispersion and grating parameters are given in the forms of $$D = \frac{2L_g}{\Delta\lambda_{chirp} v_g}; \quad (1)$$

where Lg is the grating length, $v_g$ is the group velocity, and $\Delta\lambda_{chirp}$ is the chirp bandwidth $$\Delta\lambda_{chirp}=2n_{eff}(\Lambda_{long}-\Lambda_{short})=2n_{eff}\Delta\Lambda_{chirp}. \quad (2)$$

Figure 4A:
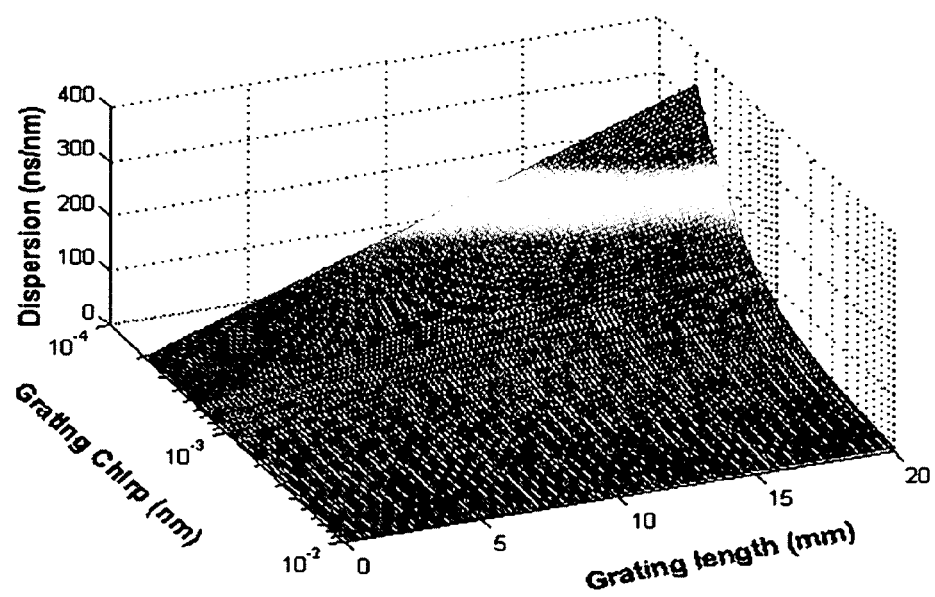
FIG. 4A shows a simulation results for dispersion as a function of chirp rate and grating length.

FIG. 4A shows a simulation results for dispersion as a function of chirp rate and grating length. High dispersion grating can be achieved by using a low chirp rate and relatively long grating. This will not work for telecommunication systems, which requires a large bandwidth. However, in deep space communications, the laser has a narrow line-width and modulates at a rate of 10 Mbps, low chirp rate can be employed to manipulate the pulse over a large dispersion range. In our case, we need to balance the trade-off among chirp rate, dispersion, and bandwidth to achieve a good pulse shaping effect for the FBG.

The dispersion of the FBG will manipulate the pulse width depending on the sign of the dispersion. In general, the pulse broadening or compressing for Gaussian pulse can be written as $$\left(\frac{T_1}{T_0}\right)^2 = 1 + 2\pi c \frac{\Delta\lambda_{chirp}^2 D_g L_g}{\lambda^2} \quad (3)$$

By introducing a figure of merit (FOM) for the bandwidth of the grating, the above equation can be redefined by recognizing the dispersion of the grating is almost 10 ns/m/$\Delta\lambda_{chirp}$. So, the pulse broadening or compressing value can be written in the form of $$\Delta T^2 = M^2 = \frac{2\pi c}{\lambda^2}(\Delta\lambda_{chirp} L_g \times 10^{-8}) \quad (4)$$

Figure 4B:
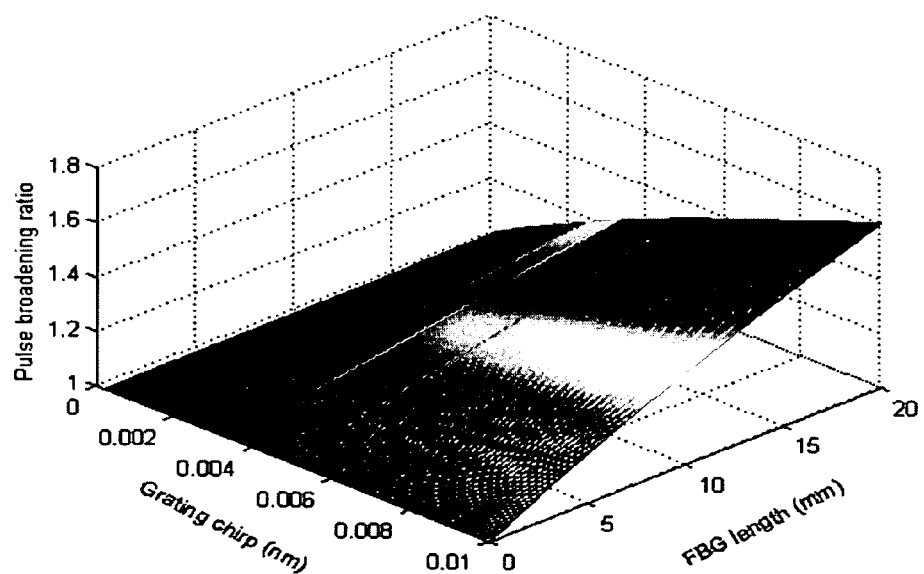
FIG. 4B shows a simulation result of pulse broadening or compressing effects from a chirped grating.
Figure 4C:
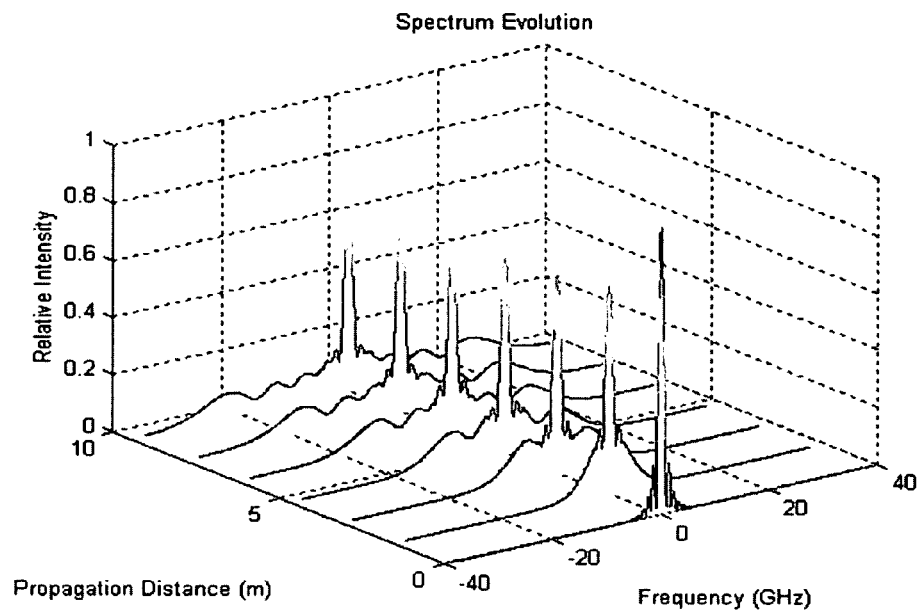
FIGS. 4C and 4D show the balance of the pulse broadening due to a pre-chirping input pulse of the amplifier without pre-compensation and with pre-compensation respectively.
Figure 4D:
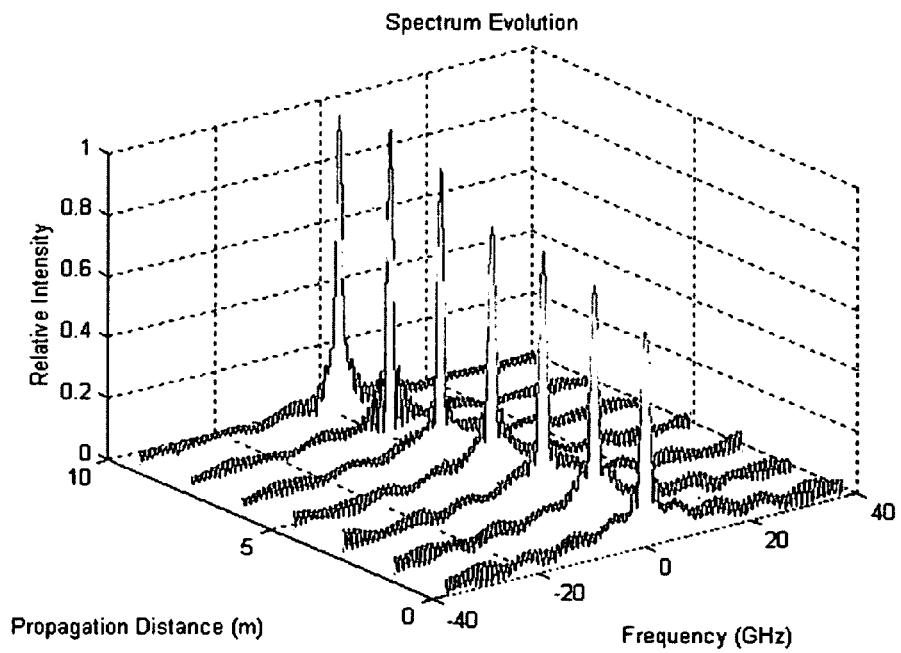

FIG. 4B shows a simulation result of pulse broadening or compressing effects from a chirped grating. It is clearly shown that by changing the chirp rate and selecting an appropriate length of the grating, the pulse width can be adjusted. This can be used to balance the SPM and correct the pulse distortion caused for the narrow pulse width high power laser. An example is given in FIGS. 4C and 4D for propagating square shape pulse in the high power amplifier using a large mode area fiber wherein the pulse broadening due to the pre-chirping of the input pulse of the amplifier are balanced without pre-compensation and with pre-compensation respectively. By using a FBG to pre-chirp the input square shape pulse, a pulse-broadening effect can be balanced significantly, e.g., at least ten times better than that without pre-compensation.

The amplified and pulse-shaped pulses then pass through an Electro-Absorption (EA) modulator 135 that is synchronized with the source laser through a connection to the pulse generator 101. The EA modulator 135 functions as a gate to further clean the ASE in the temporal domain to keep the pulses with a high extinction ratio. FIGS. 5A and 5B shows the input pulses to the EA modulator and the output pulses generated from the EA modulator with the background level reduced for extinction ratio improvement.

Referring to FIG. 2 again, the output pulses from the Electro-Absorption (EA) modulator 135 entering into a high power amplification stage powered by a second laser pump 140 through a second WDM 145 in a second erbium doped amplifier 150 denoted as EDF-II. The EDF-II 150 has a high dopant concentration and a large mode area. The EDF-II 150 may be a double cladding Er/Yb fiber, a double cladding Er doped fiber, or large mode Er doped fiber, e.g., a fiber with a length of several meters and 35 micron in diameter, in contrast to conventional fiber of over 30 meters in length and 10 micron in diameter.

Figure 6A:
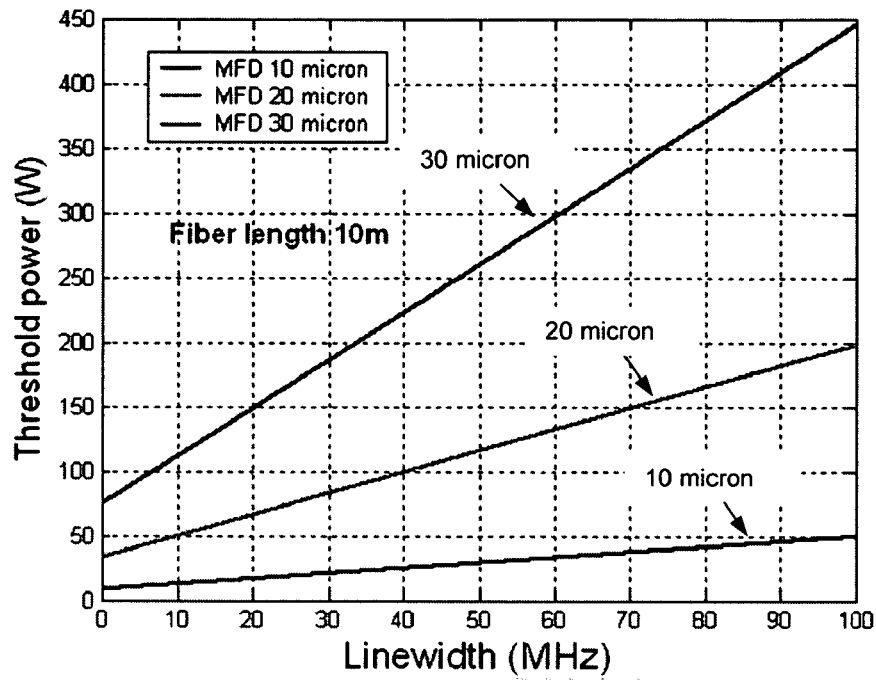
FIGS. 6A and 6B show the threshold powers for both the stimulated Brillouin scattering (SBS) and the stimulated Raman scattering (SRS).
Figure 6B:
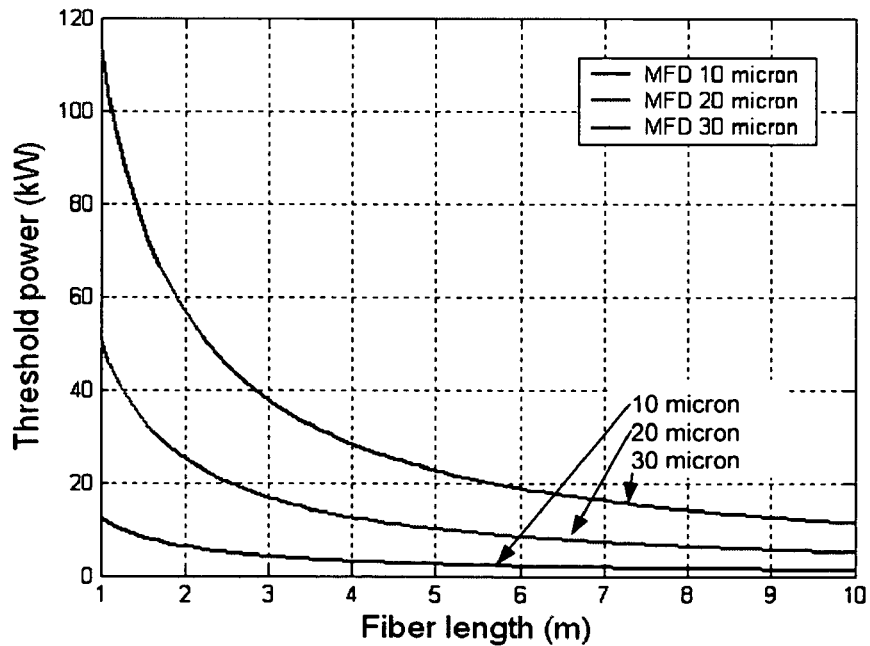
Figure 7A:
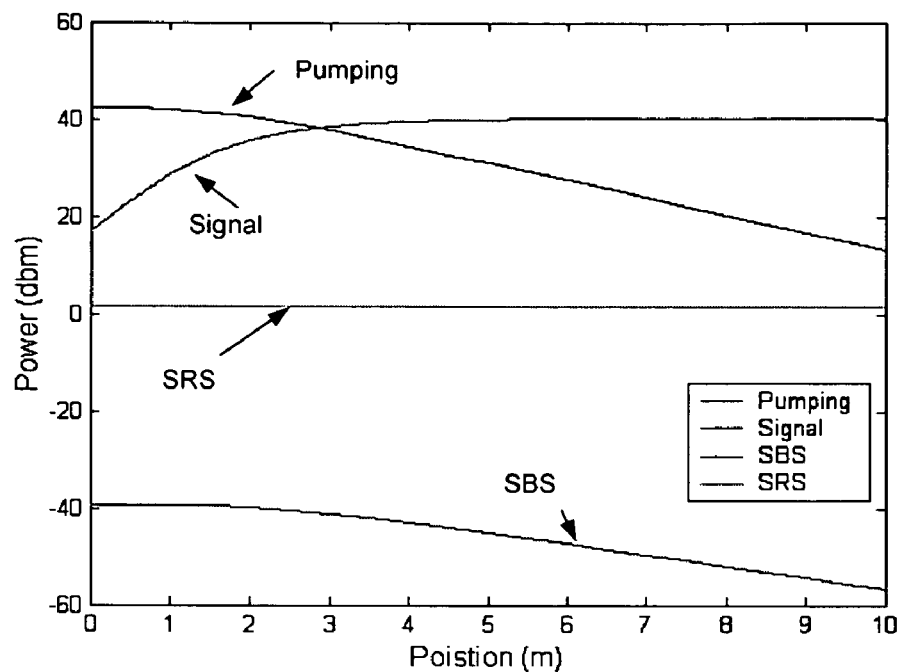
FIGS. 7A to 7F summarize the analyses results of an exemplary embodiment to amplify 1 ns pulses to obtain 1 kW peak power
Figure 7B:
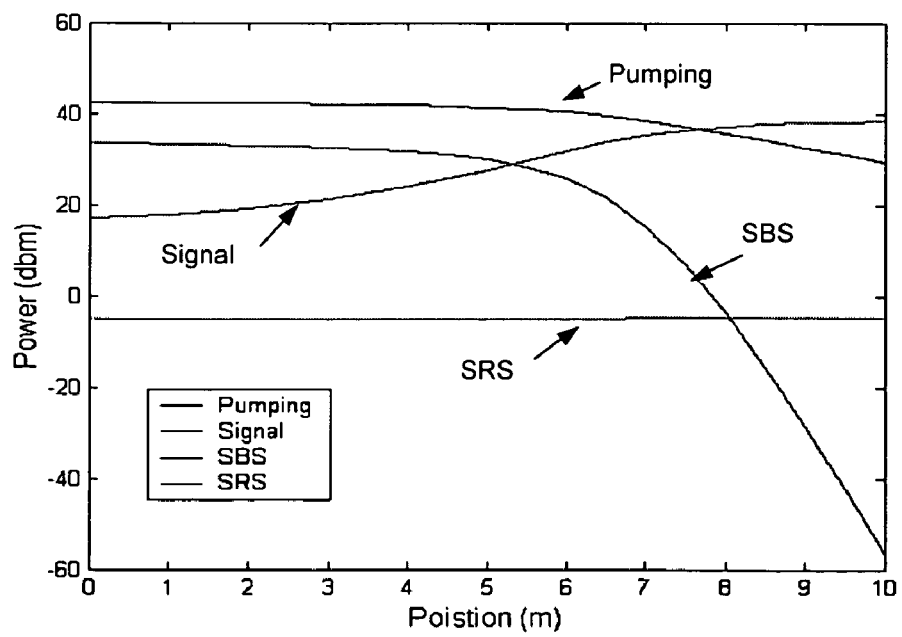
Figure 7C:
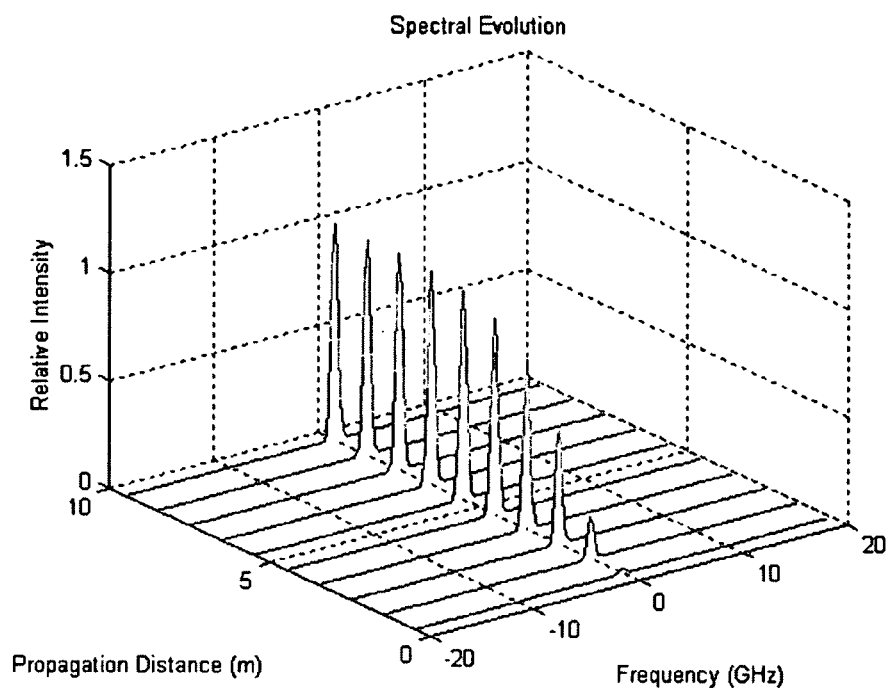
Figure 7D:
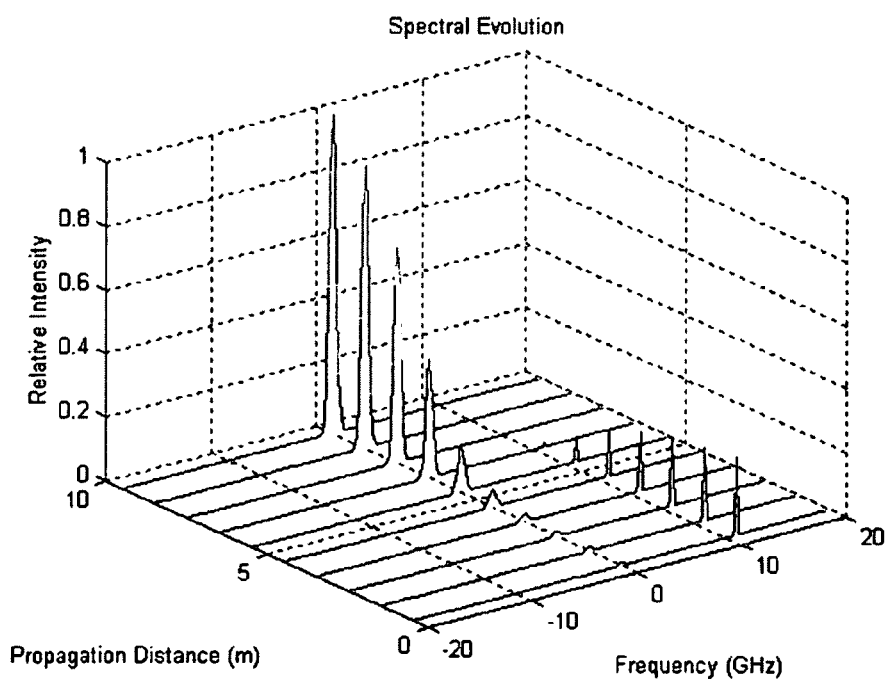
Figure 7E:
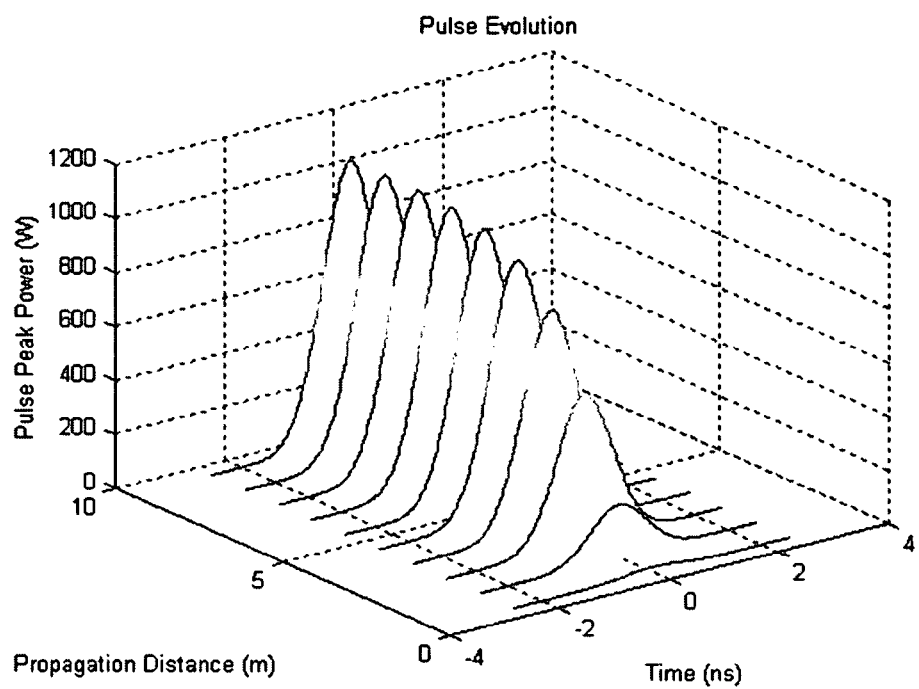
Figure 7F:
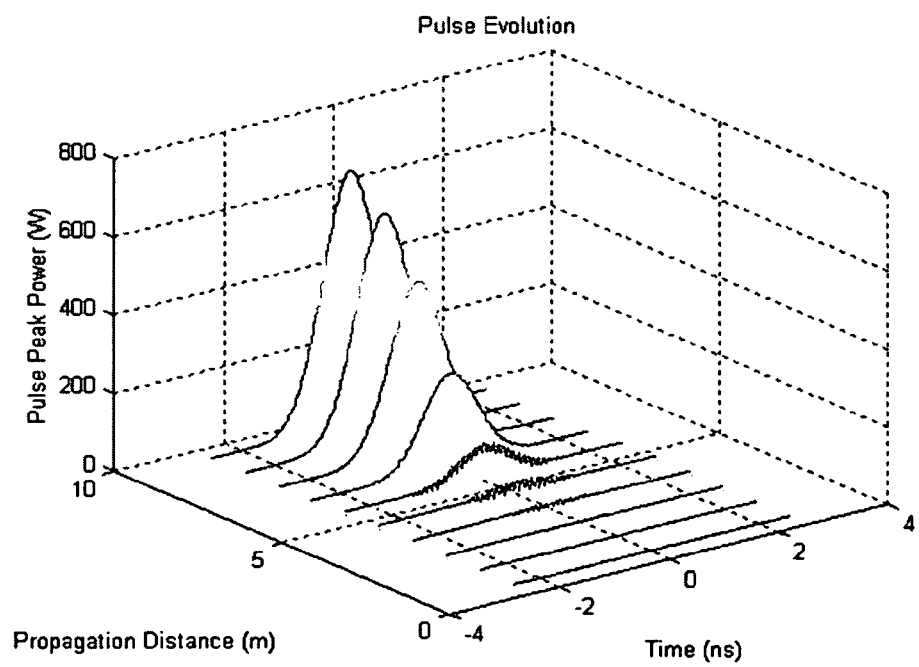

High power amplifier in the proposed approach is designed to battle with SBS and SRS and increase the saturation power. FIGS. 6A and 6B show the threshold powers for both SBS and SRS. It is shown that even for a short fiber length, the SBS has detrimental effects on the performance of the fiber laser due to a high peak power. For SRS, its threshold power is two orders of magnitude larger that that of the SBS and can be mitigated while using a short length large mode area fiber. In the present invention the fiber is provided with a large mode area and high doping concentration to provide a large saturation power and high threshold powers for SBS and SRS. Simulation of pulses propagation and amplification in the fiber laser was done in consideration of the SBS and SRS effects. FIGS. 7A to 7F summarize the analyses results of an exemplary embodiment to amplify 1 ns pulses to obtain 1 kW peak power in consideration of SBS and SRS. A comparison between a large mode area fiber and a standard single mode double cladding fiber is given in FIGS. 7A to 7F to illustrate the improvement in suppressing the SBS and SRS. It is clearly shows that the pulse is amplified to reach 1 kW peak power for the large mode area fiber with negligible SBS and SRS. However, serious impact of SBS happens for the small core size fiber and the signal power is depleted and not able to achieve 1 kW peak power. These results are important in implementation of the fiber laser with 1 ns pulse width and over 1 kW peak power.

Referring to FIG. 2 again, the EDF-II 150 is used to power up the signal pulses to the high power level with a high-power conversion efficiency then transmitted through an output coupler 160 as amplified output signals. The overall fiber cavity is designed to compensate nonlinear effects and signal chirp caused by the modulation and amplification and obtain a quasi-transform limited pulse shape. Instead of the directly modulated laser as shown in FIG. 2, an alternate preferred embodiment. May be implemented by employing an external modulator that is placed between the laser diode 115 and optical circulator 110 to generate a modulated signal. The external modulator can be biased in a way to obtain a large extinction ratio. Another embodiment is to replace the Er/Yb doped fiber 150 with a Yb doped fiber to apply this amplified laser source to another wavelength, e.g., 1060 nm.

The high power pulse-shaped fiber laser 100 as disclosed in FIG. 2 provides a high power output by modifying Er-doped concentration and the EDF II structure to achieve a high amplification with large saturation power and high power conversion efficiency with minimum non-linear effects. This improved performance is achieved by employing fiber of short length with large mode area. Specifically, those benefits are achieved by employing short length of fiber with large mode area, e.g., a fiber with a length of several meters and 35 micron in diameter. Furthermore, by operating the laser under a threshold current and applying appropriate modulation scheme in cooperation with the gating effects of the EA modulator plus the management of cavity nonlinear effects. With the implementation of the EA gating, the temporal extinction ratio is improved. Furthermore, the nonlinear effects will manipulate the pulse shape to avoid pulse spread and distortion, and the output pulses also have high extinction ratio. High quality laser pulses are generated by using a FBG and by balancing the nonlinear effects in the laser and amplifier design to correct the distorted pulses. Additionally, by further manipulating the dispersion of the fiber laser cavity, signal chirp and SPM can be compensated and the transform-limited pulses can be formed. This also helps improve the modulation extinction ratio as well. Compared with Acousto-optic (AO) modulator, the semiconductor based EA modulator is more compact and consume much less power. The high power fiber laser source as disclosed achieves a high overall efficiency because the applications of double-pass amplifications and the special design of high amplification EDF-II.

Figure 8:
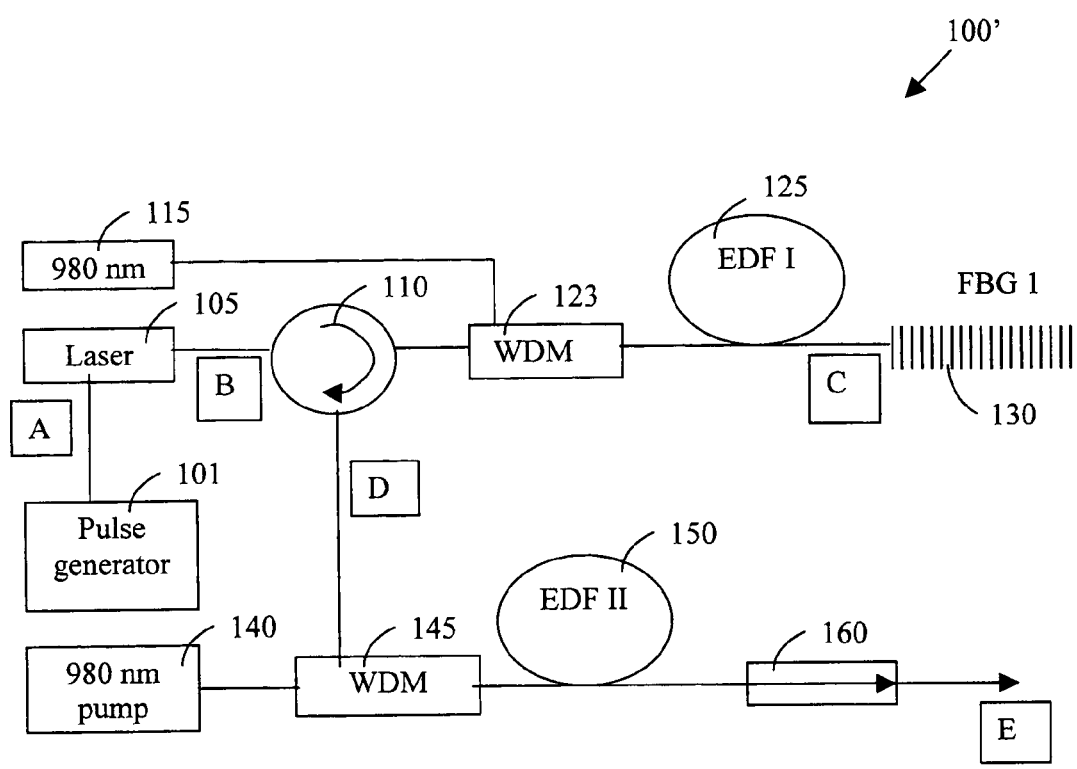
FIG. 8 is a functional block diagrams for showing an alternate embodiment of a high power pulse-shaping fiber laser similar to that shown in FIG. 1 without an EA modulator.

Referring to FIG. 8 for an alternate high power pulse shaping fiber laser 100' of this invention. The high power fiber laser 100' includes a modulated laser diode 105 that sends out a sequence of pulses generated from a pulse generator 101 to pass through a circulator 110 to enter into a first amplification stage powered by a lower power pump laser diode 115 through a first wavelength division multiplexer (WDM) 123 and a high NA EDF-I 125 to amplify the input signal into a low noise amplified signal projected to a fiber Bragg gratings 130. The Bragg gratings 130 reflect the pulses back and in the meanwhile filter the amplified spontaneous emission source (ASE) and also shape the pulses.

The amplified and pulse-shaped pulses then pass directly to a second high power amplification stage through a second WDM powered by a second laser pump 140 through a second WDM 145 in a second erbium doped amplifier 150 denoted as EDF-II in FIG. 2A. The EDF-II 150 has a high dopant concentration and a large mode area. The EDF-II 150 may be a double cladding Er/Yb fiber, a double cladding Er doped fiber, or large mode Er doped fiber. The EDF-II 150 is used to power up the signal pulses to the high power level with a high efficiency of power conversion. The overall fiber cavity is designed to compensate nonlinear effects and signal chirp caused by the modulation and amplification and obtain a quasi-transform limited pulse shape. In this embodiment, the EA module is removed to simplify the system configuration for an application to where the extinction ratio is high enough from the seed laser diode 105. In actual implementations the measured extinction ratios for different modulation schemes are always higher than 26 dB while the modulation minimum current levels are operated under threshold. Over 30 dB are possible when further optimize the bias and modulation depth for the seed laser diode 105.

Figure 9:
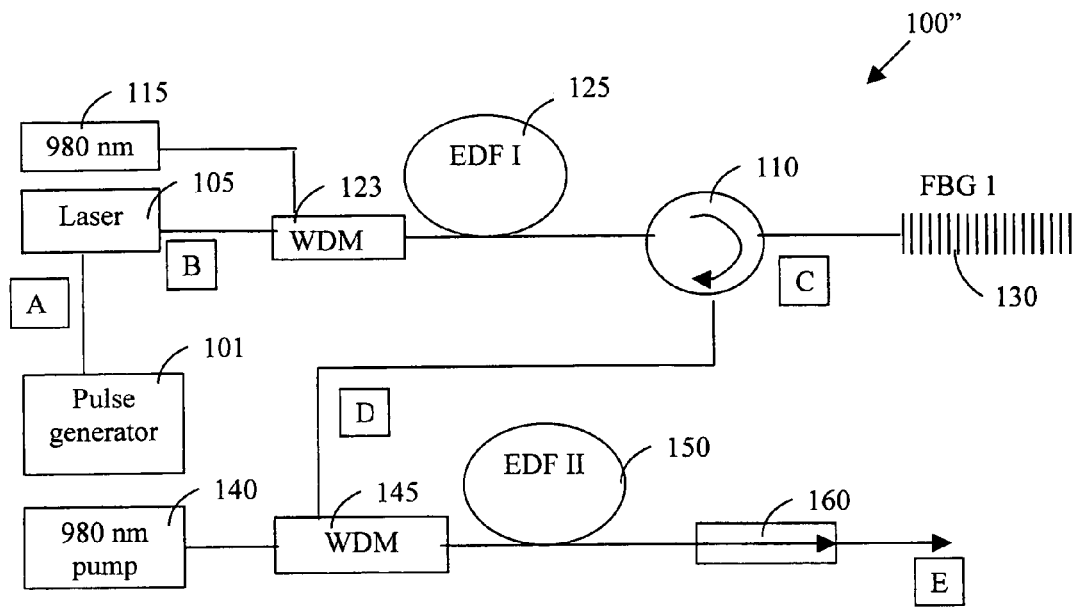
FIG. 9 is a functional block diagrams for showing an alternate embodiment of a high power pulse-shaping fiber laser similar to that shown in FIG. 1 without an EA modulator and with a circulator arranged at a different location.

Referring to FIG. 9 for another preferred embodiment of a high power pulse shaping fiber laser 100" of this invention. The high power fiber laser 100 includes a modulated laser diode 105 that sends out a sequence of pulses generated from a pulse generator 101 to pass through first wavelength division multiplexer (WDM) 123 to enter into a first amplification stage powered by a lower power pump laser diode 115 through the first wavelength division multiplexer (WDM) 123 and a high NA EDF-I 125 to amplify the input signal to a low noise amplified signal for projecting into to a fiber Bragg gratings 130 via a circulator 110. The Bragg gratings 130 reflect the pulses back and in the meanwhile filter the amplified spontaneous emission source (ASE) and also shape the pulses.

Figure 1D:
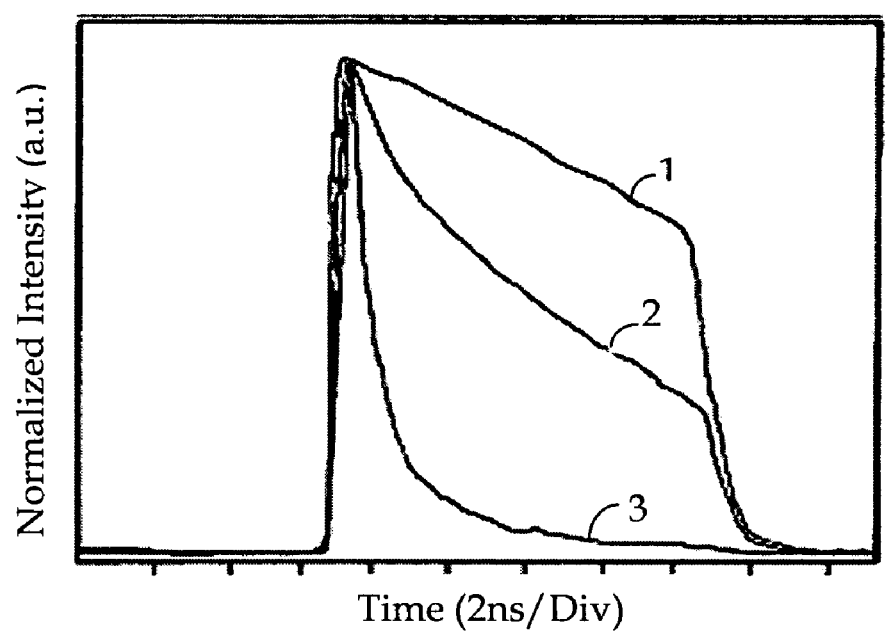

The amplified and pulse-shaped pulses then pass directly to a second high power amplification stage through a second WDM powered by a second laser pump 140 through a second WDM 145 in a second erbium doped amplifier 150 denoted as EDF-II in FIG. 2A. The EDF-II 150 may have a high dopant concentration and a large mode area and may be a double cladding Er/Yb fiber, a double cladding Er doped fiber, or large mode Er doped fiber as described above for FIG. 1. The EDF-II 150 is used to power up the signal pulses to the high power level with a high efficiency of power conversion. The overall fiber cavity as shown is again designed to compensate nonlinear effects caused by the modulation and signal chirp an amplification and obtain a quasi-transform limited pulse shape.

Figure 10:
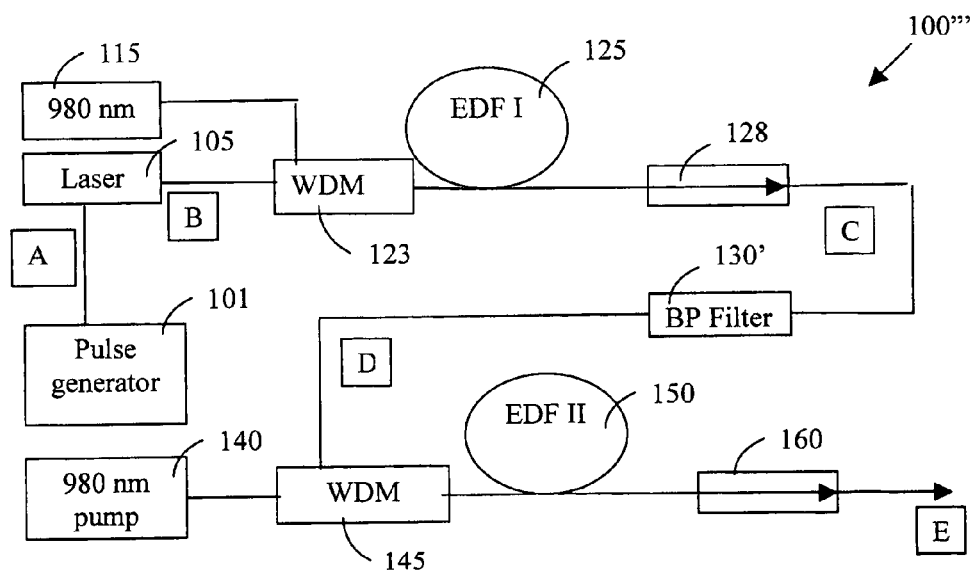
FIG. 10 is a functional block diagrams for showing an alternate embodiment of a high power pulse-shaping fiber laser source by replacing the Bragg gratings of FIG. 1 with a thin film band-pass filter.

Referring to FIG. 10 for another preferred embodiment of a high power pulse shaping fiber laser 100''' of this invention. The high power fiber laser 100''' includes a modulated laser diode 105 that sends out a sequence of pulses generated from a pulse generator 101 to pass through first wavelength division multiplexer (WDM) 123 to enter into a first amplification stage powered by a lower power pump laser diode 115 through the first wavelength division multiplexer (WDM) 123 and a high NA EDF-I 125 to amplify the input signal to a low noise amplified signal for projecting through an optical coupler 128 into to a band pass thin film filter 130'. The thin film band pass filter 130 transmitted the pulses by filtering the amplified spontaneous emission source (ASE) and also shape the pulses.

The amplified and pulse-shaped pulses then pass directly to a second high power amplification stage through a second WDM 145 powered by a second laser pump 140 through a second WDM 145 in a second erbium doped amplifier 150 denoted as EDF-II in FIG. 2A. The EDF-II 150 may have a high dopant concentration and a large mode area and may be a double cladding Er/Yb fiber, a double cladding Er doped fiber, or large mode Er doped fiber as described above for FIG. 2A. The EDF-II 150 is used to power up the signal pulses to the high power level with a high efficiency of power conversion. The overall fiber cavity as shown is again designed to compensate nonlinear effects caused by the modulation and signal chirp an amplification and obtain a quasi-transform limited pulse shape. Replacement of the thin film band pass filter for the Brag grating fiber only applies to those applications that would not require high level of tight control on dispersion and spectrum.

Three configurations as shown in FIGS. 2, 8, 9 and 10 are implemented with a pulse generator 101 that generates either square waves or Gaussian shape waves at 10-30 MHz with pulse widths from 30 ns to 4 ns. The laser diode source is selected because it is discovered that when the laser diode 105 operates under the threshold, there exists a side lobe, which degrade the pulse shape. The measurements are presented in FIGS. 11A to 11D and that should be applicable for other date rates and pulse widths as well. According to the measurements shown in FIGS. 11A to 11D, an OFS, i.e., former Lucent, double cladding Er/Yb fiber at a length of 8 m and a tapered fiber bundle is used in the measurements for the high power amplification. The pumping power at 980 nm was 3 W. About 1.1 W output signal power was obtained for a signal in 1530-1570 wavelength band. The waveforms of the pulses are measured at points A to E as that labeled in FIGS. 2, 8 to 10 for a 4 ns pulses at a wavelength of 1531.8 nm with a Gaussian shape. The modulation frequency is 30 MHz. The bandwidth of the FBG and BP filter is 0.4 nm. The pulse shape was not changed when it went through the amplifiers. In contrast, FIG. 11E shows an example of a distorted pulse without using a FBG 130 or a BP filter 130'. From above measurements, so the FBG 130 or the thin film filter 130' have three roles: First, it works as an ASE filter to clean up the spontaneous emission outside the signal wavelength. Second, it can be used to filter the side lobe of the laser diode caused by direct modulation. Third, by manipulating the dispersion of the grating, it can be used to adjust the pulse width to compensate the nonlinear effects induced pulse width change and the direct modulation induced chirp.

FIG. 12 shows the spectra for input (checking point B) and out put (E) of the amplifiers. ASE filtering and side mode cleaning effect is clearly shown in here. By using the grating filter, the OSNR has been improved over 15 dB, and the side mode is eliminated and the efficiency improved over 10%).

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

I claim:

1. An amplified laser source for amplifying a laser projection comprising:
   a diode laser source modulated by a pulse generator applying an alternate high and low voltages higher and lower than a threshold voltages projecting a modulated optical signal;
   a first erbium doped fiber (EDF) for amplifying said modulated optical signal;
   a set of Bragg gratings for receiving said modulated optical signal from said first EDF for reflecting a grating-specific pulse-distortion-reduced optical signal and a circulator for transmitting said grating-specific pulse-distortion-reduced optical signal to a second erbium doped fiber for further amplification.

2. The amplified laser source of claim 1 further comprising:
   an Electro-Absorption (EA) modulator synchronized with said pulse generator for increasing an extinction ratio of said optical signals.

3. The amplified laser source of claim 2 further comprising:
   said second erbium doped fiber (EDF) receiving and amplifying said optical signal from said Electro-Absorption (EA) modulator.

4. The amplified laser source of claim 3 wherein:
   said second erbium doped fiber (EDF) having a large mode area.

5. The amplified laser source of claim 3 wherein:
   said second erbium doped fiber (EDF) having a length of several meters and a diameter approximately thirty-five micrometers.

6. The amplified laser source of claim 2 wherein:
   said EA modulator is a semiconductor Electro-Absorption (EA) modulator.

7. An amplified laser source for amplifying a laser projection comprising:
   a diode laser source modulated by a pulse generator applying an alternate high and low voltages higher and lower than a threshold voltages projecting a modulated optical signal;
   a first erbium doped fiber (EDF) for amplifying said modulated optical signal;
   a set of Bragg gratings for receiving said modulated optical signal from said first EDF for reflecting a grating-specific pulse-distortion-reduced optical signal;
   a circulator for transmitting said grating-specific pulse-distortion-reduced optical signal to an EA modulator synchronized with said pulse generator for increasing an extinction ratio of said optical signals; and
   a second erbium doped fiber (EDF) for receiving and amplifying said optical signal from said EA modulator wherein said second erbium doped fiber (EDF) having a length of several meters and a diameter approximately thirty-five micrometers.

8. An amplified laser source for amplifying a laser projection comprising:
   a first laser gain medium for amplifying said laser projection for projecting to a set of Bragg gratings for reflecting a grating-specific pulse-distortion-reduced optical signal and a circulator for transmitting said grating-specific pulse-distortion-reduced optical signal to a second laser gain medium for further amplification; and an EA modulator synchronized with said pulse generator for increasing an extinction ratio of said optical signals.

9. The amplified laser source of claim 8 further comprising:

a diode laser source modulated by a pulse generator applying an alternate high and low voltages higher and lower than a threshold voltages projecting a modulated optical signal to said Bragg gratings.

10. The amplified laser source of claim 9 wherein:

said first laser gain medium comprising a first erbium doped fiber (EDF) for amplifying said modulated optical signal.

11. The amplified laser source of claim 8 wherein:

said second laser gain medium comprising a second erbium doped fiber (EDF) for receiving and amplifying said optical signal from said EA modulator.

12. The amplified laser source of claim 11 wherein:

said second erbium doped fiber (EDF) having a large mode area.

13. The amplified laser source of claim 11 wherein:

said second erbium doped fiber (EDF) having a length of several meters and a diameter approximately thirty-five micrometers.

14. The amplified laser source of claim 8 wherein:

said BA modulator is a semiconductor BA modulator.

* * * * *